United States Patent
Kon et al.

(10) Patent No.: US 11,469,424 B2
(45) Date of Patent: Oct. 11, 2022

(54) FUEL CELL CATALYST, MEMBRANE ELECTRODE ASSEMBLY FOR FUEL CELL, AND FUEL CELL INCLUDING THE SAME

(71) Applicant: STELLA CHEMIFA CORPORATION, Osaka (JP)

(72) Inventors: Sojiro Kon, Osaka (JP); Natsuki Mine, Osaka (JP); Yoshinori Sato, Osaka (JP); Masashi Yamamoto, Osaka (JP); Tetsuo Nishida, Osaka (JP)

(73) Assignee: STELLA CHEMIFA CORPORATION

( * ) Notice: Subject to any disclaimer, the term of this patent is extended or adjusted under 35 U.S.C. 154(b) by 65 days.

(21) Appl. No.: 17/043,753

(22) PCT Filed: Apr. 15, 2019

(86) PCT No.: PCT/JP2019/016199
§ 371 (c)(1),
(2) Date: Sep. 30, 2020

(87) PCT Pub. No.: WO2019/208310
PCT Pub. Date: Oct. 31, 2019

(65) Prior Publication Data
US 2021/0036334 A1 Feb. 4, 2021

(30) Foreign Application Priority Data

Apr. 25, 2018 (JP) .............................. JP2018-084134

(51) Int. Cl.
*H01M 4/92* (2006.01)
*H01M 4/96* (2006.01)
*H01M 8/1004* (2016.01)

(52) U.S. Cl.
CPC ............. *H01M 4/926* (2013.01); *H01M 4/96* (2013.01); *H01M 8/1004* (2013.01)

(58) Field of Classification Search
CPC ...... H01M 4/926; H01M 4/96; H01M 8/1004; H01M 4/8668; H01M 2008/1095;
(Continued)

(56) References Cited

U.S. PATENT DOCUMENTS

| | | | |
|---|---|---|---|
| 2009/0011320 A1* | 1/2009 | Senda | H01M 4/8605 502/224 |
| 2011/0003071 A1 | 1/2011 | Uensal et al. | 427/58 |
| 2018/0261866 A1* | 9/2018 | Takahashi | H01M 4/925 |

FOREIGN PATENT DOCUMENTS

| | | |
|---|---|---|
| EP | 0621236 A | 10/1994 |
| JP | 04-014761 A | 1/1992 |

(Continued)

OTHER PUBLICATIONS

Extended EuropeanSearch Report dated May 20, 2021 in corresponding European Application No. 19793800.4.
(Continued)

*Primary Examiner* — Helen Oi K Conley
(74) *Attorney, Agent, or Firm* — Ostrolenk Faber LLP

(57) ABSTRACT

A fuel cell catalyst which has high power output characteristics and suppresses degradation of power generation performance due to starting, stopping or load variation; a manufacturing method thereof; a membrane electrode assembly for fuel cell; and a fuel cell including the same. The fuel cell catalyst includes at least catalytically active species and a carrier supporting the catalytically active species. The catalytically active species are at least one selected from the group consisting of platinum, a platinum alloy, and a core-shell catalyst in which a core of a metal different from platinum is coated with a shell containing platinum, the carrier is a carbon material, and at least one of the catalytically active species and the carrier contain(s) fluorine atoms.

14 Claims, 1 Drawing Sheet

(58) Field of Classification Search
CPC ......... H01M 4/921; Y02E 60/50; B01J 27/13; B01J 35/08; B01J 37/26
See application file for complete search history.

(56) References Cited

FOREIGN PATENT DOCUMENTS

| | | | |
|---|---|---|---|
| JP | H6-256008 | A | 9/1994 |
| JP | H10-270052 | A | 10/1998 |
| JP | 2006-102568 | A | 4/2006 |
| JP | 2006-210282 | A | 8/2006 |
| JP | 2006-216503 | A | 8/2006 |
| JP | 2007-149513 | A | 6/2007 |
| JP | 2011-515795 | A | 5/2011 |
| JP | 2012-079489 | A | 4/2012 |
| WO | WO 2016/021399 | A1 | 2/2016 |
| WO | WO 2016/190248 | A1 | 12/2016 |
| WO | WO 2019/208310 | A1 | 10/2019 |

OTHER PUBLICATIONS

Feng-Yuan Zhang, et al.: "Quantitive characterization of catalyst layer degradation in PEM fuel cells by X-ray photoelectron spectroscopy", *Etfctrochlmica ACTA*, Elsevier, Amsterdam, NL, vol. 54, No. 16, Jun. 30, 2009, pp. 4025-4030, XP026085157, ISSN: 0613-4686, DOI: 10.1016/J. ELECTACTA.Feb. 28, 2009.

Seok Kim, et al.: "Preparation and electrochemical characterization of platinum and ruthenium catalysts deposited on fluorinated carbon supports", *Journal of Applied Etectrocheimistry*, Kluwer Academic Publishers, DO, vol. 39, No. 9, Mar. 18, 2009, pp. 1553-1558, XP019730277, ISSN: 1572-8838, DOI: 10.1007/S10800-009-9837-Y.

International Search Report dated Jul. 16, 2019 in corresponding PCT International Application No. PCT/JP2019/016199.

Written Opinion dated Jul. 16, 2019 in corresponding PCT International Application No. PCT/JP2019/016199.

Office Action dated Jul. 8, 2022 in corresponding Japanese Patent Application No. 2019-076934 and its translation.

\* cited by examiner

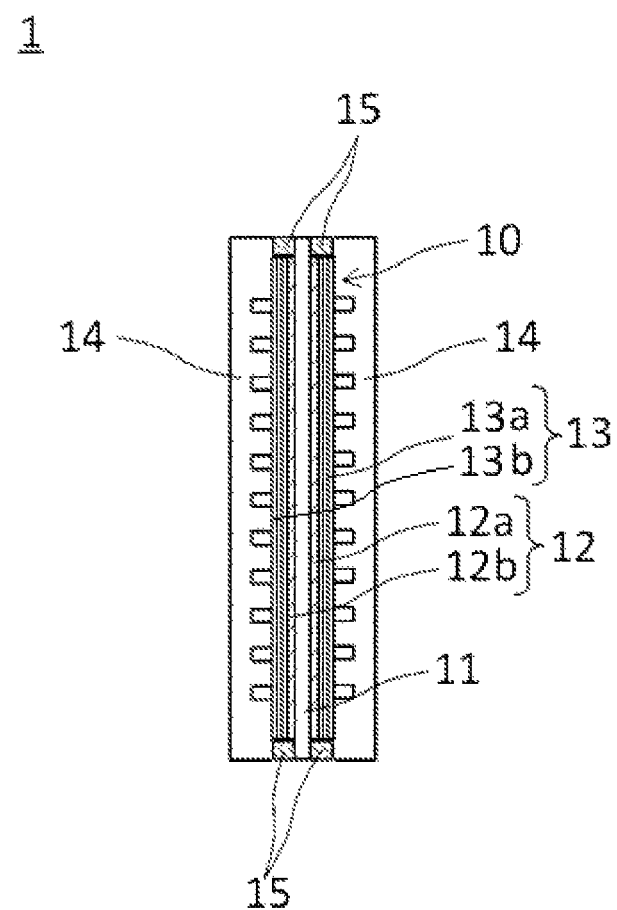

FUEL CELL CATALYST, MEMBRANE ELECTRODE ASSEMBLY FOR FUEL CELL, AND FUEL CELL INCLUDING THE SAME

CROSS-REFERENCE TO RELATED APPLICATIONS

The present application is a 35 U.S.C. §§ 371 national phase conversion of International Application No. PCT/JP2019/016199, filed Apr. 15, 2019, which claims priority to Japanese Patent Application No. 2018-084134, filed Apr. 25, 2018, the contents of both of which are incorporated herein by reference. The PCT International Application was published in the Japanese language.

TECHNICAL FIELD

The present application is a 35 U.S.C. §§ 371 national phase conversion of International Application No. PCT/JP2019/016199, filed Apr. 15, 2019, which claims priority to Japanese Patent Application No. 2018-084134, filed Apr. 25, 2018, the contents of both of which are incorporated herein by reference. The PCT International Application was published in the Japanese language.

The present invention relates to a fuel cell catalyst; a manufacturing method thereof; a membrane electrode assembly for fuel cell; and a fuel cell including the same, and more particularly to a fuel cell catalyst which has high power output characteristics and suppresses degradation of power generation performance due to starting, stopping or load variation; a manufacturing method thereof; a membrane electrode assembly for fuel cell; and a fuel cell including the same.

BACKGROUND ART

A fuel cell directly converts chemical energy into electric energy, and discharges only water during conversion, and is therefore attracting attention as a clean power generation system. Fuel cells are classified according to the type of an electrolyte and an electrode to be used. Representative fuel cells include, for example, solid polymer type, solid oxide type, phosphoric acid type, molten carbonate type, solid electrolyte type, alkaline type fuel cells and the like. Of these fuel cells, the solid polymer electrolyte fuel cell exhibits low operating temperature (usually 100° C. or lower) and can be miniaturized, so that it is used as household cogeneration systems, electric vehicle power supplies, portable power supplies, information equipment power supplies and the like.

A solid polymer electrolyte fuel cell commonly has a basic structure in which a pair of gas diffusion layers and a metal separator are sequentially stacked on both sides of a membrane electrode assembly (MEA). This basic structure is called "cell". The membrane electrode assembly has a structure in which a solid electrolyte membrane having proton conductivity is sandwiched between a pair of electrode catalyst layers, i.e., an anode side electrode catalyst layer and a cathode side electrode catalyst layer. The electrode catalyst layer is commonly composed of a supported catalyst in which a catalytically active species which promote a fuel cell reaction is supported on a carrier having conductivity, and an ionomer having proton conductivity.

A fuel gas containing hydrogen gas is supplied on the anode side, an oxidant gas containing oxygen gas is supplied on the cathode side, and the reaction shown by the following chemical reaction formula proceeds on a three-phase interface formed on the catalytically active species in each electrode catalyst layer, leading to power generation of the solid polymer electrolyte fuel cell.

[Chemical Formula 1]

$$H_2 \rightarrow 2H^+ + 2e^- \text{ (Anode side)} \quad (1)$$

$$O_2 + 4H^+ + 2H_2O \text{ (Cathode side)} \quad (2)$$

Patent Document 1 discloses, as such a solid polymer electrolyte fuel cell, for example, a fuel cell catalyst comprising a carbonaceous material, a cation exchange resin which is a solid polymer electrolyte, and catalyst metal particles, wherein the catalyst metal particles are mainly supported on a contact surface between the carbonaceous material and a proton conduction path of the cation exchange resin. The patent document mentions that the thickness (A) of the cation exchange resin and the particle diameter (B) of the catalyst metal particles satisfy a relationship of $B \leq A \leq B \times 1.2$, thereby increasing the utilization rate of the catalyst metal, thus obtaining high power output and excellent durability performance. However, even in the fuel cell catalyst disclosed in Patent Document 1, power output is insufficient, and further improvement is required.

Patent Document 2 discloses fluorine-containing carbon particles satisfying a relationship of $0.8 \leq (F/C)s/(F/C)w \leq 1.2$, where $(F/C)s$ represents a ratio of the number of fluorine atoms to the number of carbon atoms on an outer surface of the fluorine-containing carbon particles, and $(F/C)w$ represents a ratio of the number of fluorine atoms to the number of carbon atoms in the whole fluorine-containing carbon particles. Patent Document 2 mentions that platinum is supported on a carrier composed of the fluorine-containing carbon particles and a fuel cell catalyst thus obtained is used, thus obtaining a fuel cell which has high power generation performance and hardly causes degradation of power generation performance. However, even in the fuel cell catalyst using the fluorine-containing carbon particles disclosed in Patent Document 2 has insufficient power generation performance, and further improvement is required.

PRIOR ART DOCUMENTS

Patent Documents

Patent Document 1: JP 2012-79489 A
Patent Document 2: WO2016/190248

SUMMARY OF THE INVENTION

Problems to be Solved by the Invention

The present invention has been made in view of the above-mentioned problem, and it is an object of the present invention to provide a fuel cell catalyst with high power output characteristics in which degradation of power generation performance due to starting, stopping or load variation is suppressed; a manufacturing method thereof; a membrane electrode assembly for fuel cell; and a fuel cell including the same

Solutions to the Problems

In order to solve the above-mentioned problems, the present invention is a fuel cell catalyst comprising at least a catalytically active species and a carrier supporting the catalytically active species, wherein the catalytically active species is at least one selected from the group consisting of platinum, a platinum alloy, and a core-shell catalyst in which a core of a metal different from platinum is coated with a shell containing platinum, the carrier is a carbon material, and at least one of the catalytically active species and the carrier contain(s) fluorine atoms.

In the configuration, it is preferable that a ratio of the number of fluorine atoms contained in at least one of the catalytically active species and the carrier to the number of carbon atoms contained in the carrier satisfies a relationship shown in the following formula (1):

$$(F/C)s/(F/C)w<0.8 \quad (1)$$

where (F/C)s represents a ratio of the number of fluorine atoms to the number of carbon atoms on the surface of the fuel cell catalyst, and (F/C)w represents a ratio of the number of fluorine atoms to the number of carbon atoms in the whole fuel cell catalyst.

In the configuration, it is preferable that the (F/C)s is less than 0.4.

In the configuration, it is preferable that the carbon material is at least one selected from the group consisting of graphite, graphite oxide, carbon black, graphitized carbon black, diamond-like carbon, fullerene, single-walled carbon nanotube, multi-walled carbon nanotube, carbon nanohorn, carbon nanowall, carbon nanofiber, carbon nanobrush, single layer graphene, multilayer graphene and graphene oxide.

In order to solve the above-mentioned problems, the present invention is a membrane electrode assembly for fuel cell, comprising at least a solid polymer electrolyte membrane and an electrode catalyst layer arranged on both sides of the solid polymer electrolyte membrane, wherein the electrode catalyst layer comprises at least the fuel cell catalyst and an ionomer which coats the fuel cell catalyst.

In the configuration, it is preferable that the ionomer is a fluorine-based resin.

In the configuration, it is preferable that the ionomer is an aromatic hydrocarbon resin.

In the configuration, it is preferable that the ionomer is an ionic liquid.

In order to solve the above-mentioned problems, the present invention is a fuel cell comprising the membrane electrode assembly for fuel cells.

Effects of the Invention

According to the present invention, it is possible to provide a fuel cell catalyst which has high catalytic activity, and which can improve power output characteristics by an improvement in oxidation-reduction reaction and also can suppress degradation of power generation performance due to starting, stopping and load (variation) response; a method for producing the same; a membrane electrode assembly for fuel cell; and a fuel cell.

BRIEF DESCRIPTION OF THE DRAWINGS

FIG. 1 is a schematic cross-sectional view showing a fuel cell having a single cell structure according to the embodiment of the present invention.

EMBODIMENT OF THE INVENTION (Fuel Cell Catalyst)
The fuel cell catalyst according to the present embodiment has a structure of a support comprising at least a catalytically active species and a carrier supporting the catalytically active species. Fluorine atoms are contained in at least one of the catalytically active species and the carrier. The fuel cell catalyst of the present embodiment can be suitably used for a solid polymer type fuel cell or the like.

<Carrier>
First, the carrier constituting the fuel cell catalyst will be described.

As used herein, "carrier" means an electron conductive substance used for the purpose of suppressing excessive aggregation of catalytically active species in an anode side electrode catalyst layer and/or a cathode side electrode catalyst layer (hereinafter sometimes simply referred to as "electrode catalyst layer").

The carrier of the present embodiment is composed of a carbon material. Examples of the carbon material include, but are not particularly limited to, activated carbon, carbon black, graphitized carbon black, hard carbon, soft carbon, mesoporous carbon, natural graphite, artificial graphite, diamond-like carbon, fullerene, single-walled carbon nanotube, multi-walled carbon nanotube, carbon nanohorn, carbon nanowall, carbon nanofiber, carbon nanobrush, single layer graphene, multilayer graphene, graphene oxide and the like. These carbon materials may be used alone or in combination of two or more types thereof. From the viewpoint of the conductivity, chemical stability and availability, preferred are carbon black, graphitized carbon black, single-walled carbon nanotube, multi-walled carbon nanotube, single layer graphene and multilayer graphene.

The specific surface area of the carbon material may be a specific surface area sufficient to support the catalytically active species in a highly dispersed manner. Specifically, the specific surface area is preferably 10 to 1,500 $m^2/g$, more preferably 30 to 1,200 $m^2/g$, and particularly preferably 50 to 1,000 $m^2/g$. By setting the specific surface area at 10 $m^2/g$ or more, a large amount of catalytically active species is supported on the carrier, leading to an improvement in performance of the fuel cell. Meanwhile, by setting the specific surface area at 1,500 $m^2/g$ or less, it is possible to suppress degradation of the utilization rate of the catalytically active species to be supported. The specific surface area of the carbon material can be measured based on, for example, the BET method of Japanese Industrial Standard JIS Z8830:2013.

When the carrier contains fluorine atoms, for example, when an ionomer (details will be described later) contains fluorine atoms, it is possible to improve the affinity between the carrier and the ionomer. An improvement in affinity with the ionomer leads to a state where oxygen diffusion and proton diffusion, which are mentioned as rate-determining factors, are promoted at a three-phase interface (interface at which three phases of a reaction gas composed of a fuel cell catalyst, a solid polymer electrolyte, and oxygen (oxidant) or hydrogen (reducing agent) are in contact with each other) in the electrode catalyst layer. In a conventional fuel cell, transfer limitation of oxygen and protons in the mass transfer process occurs in a high current density region, thus causing degradation of the cell performance. However, promotion of diffusion of oxygen and protons enables reduction in transfer limitation thereof. As a result, the oxygen reduction reaction is improved, thus enabling high power output in the high current density region.

Moreover, since fluorine atoms are present on the outer surface of the carbon material and/or the inner surface of pores, corrosion of the carbon material can be reduced or suppressed. This makes it possible to reduce desorption of catalytically active species due to corrosion of the carbon material in the case of starting and stopping of the fuel cell, and to suppress degradation of the power generation performance due to repeating of starting and stopping of the fuel cell.

The content of fluorine atoms is preferably 0.1 to 30% by mass, more preferably 0.25 to 20% by mass, and particularly preferably 0.5 to 15% by mass, based on the total mass of the fuel cell catalyst. By setting the content of fluorine atoms at 0.1% by mass or more, it is possible to suppress degradation of the power generation performance due to repeating of starting and stopping of the fuel cell, as mentioned above. It is also possible to obtain a fuel cell which enables high power output in the high current density region. Meanwhile, by setting the content of fluorine atoms at 30% by mass or less, it is possible to suppress degradation of the conductivity.

Fluorine atoms are present on the outer surface of the carbon material or the inner surface of pores in a state of being adsorbed by, for example, chemical adsorption and/or physical adsorption.

It is preferable that fluorine atoms are uniformly present on the outer surface of the carbon material. It is preferable that fluorine atoms are also uniformly present inside pores of the carbon material. This makes it possible to prevent the carbon material from being corroded in a region where no fluorine atom is present on the outer surface of the carbon material and the inner surface of pores.

<Catalytically Active Species>

Next, the catalytically active species according to the present embodiment will be described.

As used herein, "catalytically active species" means a substance capable of exerting a catalytic function in an electrochemical reaction in a fuel cell. The catalytically active species of the present embodiment specifically comprises at least one active species selected from the group consisting of platinum, a platinum alloy and a core-shell catalyst.

In the platinum alloy, examples of the metal constituting the alloy with platinum include, but are not particularly limited to, boron, magnesium, aluminum, silicon, calcium, scandium, titanium, vanadium, chromium, manganese, iron, cobalt, nickel, copper, zinc, gallium, germanium, strontium, yttrium, zirconium, niobium, molybdenum, technetium, ruthenium, rhodium, palladium, silver, indium, tin, antimony, barium, hafnium, tantalum, tungsten, rhenium, osmium, iridium, gold, lead, bismuth, lanthanum, cerium and the like. These metals may be used alone or in combination of two or more types thereof to form a platinum alloy. From the viewpoint of the catalytic performance, the metal constituting the alloy with platinum is preferably ruthenium, molybdenum, osmium, cobalt, rhodium, iridium, iron, nickel, titanium, tungsten, palladium, rhenium, chromium, manganese, tantalum and gold.

The content of platinum in the platinum alloy is preferably in a range of 1 to 99% by mass, more preferably 3 to 75% by mass, and still more preferably 5 to 50% by mass, based on the total mass of the platinum alloy. If the content of platinum is 1% by mass or more, it is possible to improve the catalytic function in the fuel cell reaction. Meanwhile, if the content of platinum is 99% by mass or less, it is possible to form alloys with metals other than platinum.

The core-shell catalyst is a catalyst in which a core made of metals other than platinum is coated with a shell containing platinum. The metal constituting the core is not particularly limited as long as it is other than platinum, and examples thereof include nickel, copper, palladium, silver, gold, iridium, titanium, iron, cobalt, ruthenium, osmium, chromium, molybdenum and tungsten. Of these metals, nickel, copper, palladium, silver, gold, iridium, titanium, iron, cobalt and ruthenium are preferable from the viewpoint of the catalytic performance. These metals may be used alone or in combination of two or more types thereof.

The shell is not particularly limited as long as it contains at least platinum. For example, in addition to the case where the shell is made only of platinum, and there may be the case where the shell contains the platinum and at least one of nickel, copper, palladium, silver or gold.

When the catalytically active species contains other fluorine atoms, other fluorine atoms are present on the surface of the catalytically active species in a state of being adsorbed by chemical adsorption and/or physical adsorption.

When the catalytically active species contains other fluorine atoms, it is possible to improve the affinity with the carbon material or the like, for example, when using a carbon material and/or an ionomer containing fluorine atoms. This leads to a state where oxygen diffusion and proton diffusion, which are mentioned as rate-determining factors, are promoted at the above three-phase interface in the electrode catalyst layer. As a result, like the above-mentioned case, it is possible to further reduce transfer limitation of oxygen and protons, leading to an improvement in oxygen reduction reaction, thus enabling high power output in the high current density region.

When the catalytically active species contains other fluorine atoms, the content of the other fluorine atoms is the total amount with the amount of the fluorine atom contained in the carbon material as the carrier, and is preferably 0.1 to 30% by mass, more preferably 0.25 to 20% by mass, and particularly preferably 0.5 to 10% by mass, based on the total mass of the fuel cell catalyst. By setting the total content of other fluorine atoms and the fluorine atom at 0.1% by mass or more, it is possible to suppress degradation of the power generation performance due to repeating of starting and stopping of the fuel cell, as mentioned above. It is also possible to obtain a fuel cell which enables high power output in a high current density region. Meanwhile, by setting the total content of the other fluorine atoms and the fluorine atom at 30% by mass or less, it is possible to suppress degradation of the conductivity.

The average particle diameter of the catalytically active species supported on the carbon material is not particularly limited, but is usually 0.1 to 50 nm, preferably 0.5 to 30 nm, and more preferably 1 to 20 nm. By setting the average particle diameter of the catalytically active species at 0.1 nm or more, the catalytic activity can be increased. Meanwhile, by setting the average particle diameter of the catalytically active species at 50 nm or less, it is possible to suppress reduction in active sites due to reduction in specific surface area of the catalytically active species. The average particle diameter of the catalytically active species means an average of the measured diameters of the circumscribed circles of the catalytically active species. Specifically, it is a value calculated by an average of particle diameters of at least 500 catalytically active species dispersed in a visual field of 500 nm×500 nm in an observation image of a transmission electron microscope or a scanning electron microscope.

The maximum particle diameter of the catalytically active species supported on the carbon material is not particularly limited, but is usually 0.1 to 60 nm, preferably 0.5 to 30 nm, and more preferably 1 to 20 nm. By setting the maximum particle diameter of the catalytically active species at 0.1 nm or more, the reaction surface area increases, thus making it possible to increase the catalytic activity per unit catalyst mass. Meanwhile, by setting the maximum particle diameter of the catalytically active species at 60 nm or less, it is possible to suppress reduction in active sites due to reduction in specific surface area of the catalytically active species. More specifically, the maximum particle diameter means a particle diameter of particles having a maximum particle diameter which can be visually recognized in a visual field of 500 nm×500 nm.

The average particle diameter and the maximum particle diameter of the catalytically active species are values each measured by using the value of the major axis as the particle diameter when the shape is a shape other than a spherical shape, for example, an elliptical shape, or by using the equivalent circle diameter as the particle diameter when the shape is the other shape.

The content of the catalytically active species is not particularly limited, but is usually 5 to 80% by mass, preferably 10 to 75% by mass, and more preferably 15 to 70% by mass, based on the total mass of the fuel cell catalyst. By setting the content of the catalytically active species at 5% by mass or more, it is possible to maintain high catalytic activity. Meanwhile, by setting the content of the catalytically active species at 80% by mass or less, it is possible to suppress reduction in proportion of the catalytically active species which are effectively used. It is also possible to suppress reduction in catalytic activity due to aggregation of the catalytically active species to be supported on the carrier.

<Ratio of Number of Fluorine Atoms to Number of Carbon Atoms in Fuel Cell Catalyst>

In the present embodiment, it is preferable that a ratio of the number of fluorine atoms contained in at least one of the catalytically active species and the carrier to the number of carbon atoms as the carrier satisfies a relationship of the following formula (1):

$$(F/C)s/(F/C)w<0.8 \quad (1)$$

where $(F/C)s$ represents a ratio of the number of fluorine atoms to the number of carbon atoms on the surface of the fuel cell catalyst, and $(F/C)w$ represents a ratio of the number of fluorine atoms to the number of carbon atoms in the whole fuel cell catalyst.

By making the ratio of the number of carbon atoms and the number of fluorine atoms satisfy a relationship represented by the formula (1), degradation of the conductivity of the fuel cell catalyst is suppressed, thus enabling excellent catalytic activity. The value of $(F/C)s/(F/C)w$ is preferably 0.1 or more and less than 0.8, and more preferably 0.3 or more and less than 0.8.

The value of the $(F/C)s$ can be calculated using X-ray photoelectron spectroscopy (XPS). The $(F/C)w$ can be calculated by the combustion flask method. In other words, the fuel cell catalyst is burned in a flask filled with oxygen, and the generated gas is absorbed by a sample liquid in the flask. A fluorine ion in the sample liquid dissolved by absorption of the gas is measured by ion chromatography. Thus, the value of $(F/C)w$ can be calculated.

The upper limit of the $(F/C)s$ is preferably less than 0.4, more preferably less than 0.3, still more preferably less than 0.2, and particularly preferably less than 0.1. By setting the upper limit of the $(F/C)s$ at less than 0.3, it is possible to suppress degradation of the conductivity and to form the surface having oxidation resistance. The lower limit of the $(F/C)s$ is preferably 0.001 or more.

<Work Function of Fuel Cell Catalyst>

The work function of the fuel cell catalyst according to the present embodiment is preferably 4 to 7.5 eV, more preferably 4 to 7 eV, and particularly preferably 5 to 6.5 eV. If the work function of the fuel cell catalyst is 4 eV or more, it is possible to satisfactorily maintain electron conductivity. Meanwhile, if the work function of the fuel cell catalyst is 7.5 eV or less, it is possible to improve the oxidation resistance without impairing the electron conductivity. The work function of the fuel cell catalyst can be measured by ultraviolet photoelectron spectroscopy or the like.

(Method for Manufacturing Fuel Cell Catalyst)

Next, a method for manufacturing a fuel cell catalyst according to the present embodiment will be described.

Examples of the method for manufacturing a fuel cell catalyst according to the present embodiment include a method A in which a catalytically active species is supported after subjecting a carrier to a fluorination treatment, a method B in which a fluorination treatment is performed after supporting a catalytically active species on a carrier, and a method C in which a catalytically active species subjected to a fluorination treatment is supported on a carrier. In the present embodiment, a refluorination treatment may be applied to the methods A and B.

<Supporting of Catalytically Active Species>

There is no particular limitation on the method for supporting a catalytically active species on a carrier, and a known method can be employed. For example, a carbon material as a carrier is dispersed in a reaction solution in which a precursor of a catalytically active species is dissolved. The dispersion method is not particularly limited, but a known method can be employed. Next, an appropriate reducing agent is added to this reaction solution to reduce metal ion species of the dissolved precursor, thus supporting the catalytically active species on the surface of the carrier. Subsequently, solid-liquid separation of the reaction solution is performed and then the solid component is dried. As a result, a carrier of catalytically active species is obtained. The catalytically active species can be supported on the carbon material regardless of whether or not fluorine atoms are introduced into the catalytically active species and the carbon material.

For example, when the catalytically active species is composed of platinum as single metal and the carbon material is carbon black, hexachloroplatinic acid and a salt thereof are dissolved in water as a platinum precursor to fabricate a reaction solution. Subsequently, the above carbon black is added and dispersed in the reaction solution, and a reducing agent is further added. Examples of the reducing agent include, but are not particularly limited to, sodium borohydride, hydrazine, formaldehyde, alcohol and the like. By adding the reducing agent, fine particles of platinum are reduced and deposited on the surface of the carbon black. Subsequently, the reaction solution is subjected to solid-liquid separation and the solid component is dried, thus making it possible to fabricate a carrier of catalytically active species in which fine particles of platinum are supported on the surface of the carbon black or inside pores.

<Introduction of Fluorine Atoms>

It is possible to introduce fluorine atoms into a catalytically active species, a carbon material, or a carbon material supporting a catalytically active species by performing a fluorination treatment. By performing the fluorination treatment, a fluorine group by a carbon-fluorine bond is introduced on the surface of the carbon material or inside pores. Therefore, for example, unlike an oxidation treatment in which an oxygen-containing functional group such as a hydroxyl group, a carbonyl group or a carboxyl group is imparted to the edge portion of a carbon hexagonal net surface, it is possible to fluorinate the surface without causing structural defects such as damage or decomposition of the carbon material.

Examples of the method of a fluorination treatment include, but are not particularly limited to, a method in which a treatment gas containing a fluorine atom-containing gas is brought into contact with a treatment target such as a catalytically active species, a method in which a treatment liquid obtained by dissolving a fluorine atom-containing gas in a solvent is brought into contact with a treatment target, a method in which a treatment liquid obtained by dissolving a fluorinating agent in a solvent is brought into contact with a treatment target, and the like.

It is possible to use, as the treatment gas, a gas containing a fluorine atom-containing gas in an amount of 0.1 to 100 vol %, preferably 0.2 to 80 vol %, and more preferably 0.3 to 50 vol %, based on the total volume. By setting the concentration of the fluorine atom-containing gas at 0.1 vol % or more, it is possible to prevent insufficient introduction of fluorine atoms into the treatment target such as a catalytically active species.

The fluorine atom-containing gas means a gas containing fluorine atoms, and is not particularly limited in the present embodiment as long as it contains fluorine atoms. Examples of the fluorine atom-containing gas include fluorine ($F_2$), hydrogen fluoride (HF), chlorine trifluoride ($ClF_3$), bromine trifluoride ($BrF_3$), bromine pentafluoride ($BrF_5$), iodine pentafluoride ($IF_5$), phosphorus pentafluoride ($PF_5$), sulfur tetrafluoride ($SF_4$), boron trifluoride ($BF_3$), nitrogen trifluoride ($NF_3$), carbonyl fluoride ($COF_2$) and the like. These fluorine atom-containing gases may be used alone or in combination of two or more types thereof.

The treatment gas may contain an inert gas. The inert gas is not particularly limited, but unpreferable inert gas includes those which react with the fluorine atom-containing gas to exert an adverse influence on a fluorination treatment of a carbon material, those which react with a carbon material to exert an adverse influence, and those containing impurities which exert an adverse influence. Specific examples of the inert gas include nitrogen, argon, helium, neon, krypton, xenon and the like. These inert gases may be used alone or in combination of two or more types thereof. The purity of the inert gas is not particularly limited, but the content of impurities which exert an adverse effect is preferably 100 ppm or less, more preferably 10 ppm or less, and particularly preferably 1 ppm or less.

The treatment gas may contain a halogen atom-containing gas (excluding a fluorine atom-containing gas). Examples of the halogen atom-containing gas include chlorine gas, bromine gas and the like. These gases can be used alone or in combination of two or more types thereof.

There is no particular limitation on the method of contacting a treatment gas with a treatment target such as a catalytically active species, and the treatment gas can be contacted under the flow of the treatment gas, or in the sealed state.

In the case of a method in which a treatment liquid obtained by dissolving a fluorine atom-containing gas in a solvent is brought into contact with a carbon material, the solvent is not particularly limited, but an aprotic polar solvent or a protic polar solvent can be used.

Examples of the aprotic polar solvent include, but are not limited to, hexane, benzene, toluene, chloroform, dichloromethane, acetone, methyl ethyl ketone, methyl propyl ketone, methyl isobutyl ketone, diisobutyl ketone, cyclohexanone, tetrahydrofuran, diisopropyl ether, dibutyl ether, 1,4-dioxane, 1,3-dioxolane, dimethoxyethane, ethylene glycol dimethyl ether, γ-butyrolactone, γ-valerolactone, acetonitrile, propionitrile, dimethyl sulfoxide, dimethyl sulfone, sulfolane, 1,3-propanesultone, dimethyl sulfate, trimethyl phosphate, triethyl phosphate, N,N-dimethylformamide, N-methyl-2-pyrrolidone, methyl acetate, ethyl acetate, butyl acetate, propylene carbonate, ethylene carbonate, dimethyl carbonate, ethyl methyl carbonate and the like. These aprotic polar solvents can be used alone or in combination of two or more types thereof.

Examples of the aprotic polar solvent include, but are not particularly limited to, water, acetic acid, formic acid, methanol, ethanol, isopropyl alcohol, butanol, nitromethane, nitroethane and the like. These aprotic polar solvents may be used alone or in combination of two or more types thereof.

The concentration of the fluorine atom-containing gas in the treatment liquid is not particularly limited, but is usually 0.1 to 100% by mass, preferably 0.2 to 80% by mass, and more preferably 0.3 to 50% by mass, based on the total mass of the treatment liquid. By setting the concentration of the fluorine atom-containing gas at 0.1% by mass or more, it is possible to prevent insufficient introduction of fluorine atoms into the treatment target such as a catalytically active species.

In the case of a method of contacting a treatment liquid obtained by dissolving a fluorinating agent in a solvent with a treatment target such as a catalytically active species, examples of the fluorinating agent include, but are not particularly limited to, potassium fluoride, potassium bifluoride, tetrabutylammonium fluoride hydrate, tetrabutylammonium bifluoride, tetrabutylammonium dihydrogen trifluoride, tetramethylammonium fluoride tetrahydrate, 1-fluoropyridinium tetrafluoroborate, 1-fluoropyridinium trifluoromethanesulfonate, 1-fluoro-2,4,6-trimethylpyridinium trifluoromethanesulfonate, fluorinating agent F-51 and the like. These fluorinating agents may be used alone or in combination of two or more types thereof.

The solvent for dissolving the fluorinating agent is not particularly limited, and it is possible to use the above-mentioned aprotic polar solvent and protic polar solvent. Therefore, detailed description thereof will be omitted.

The concentration of the fluorinating agent in the treatment liquid is not particularly limited, but is usually 0.1 to 100% by mass, preferably 0.2 to 80% by mass, and more preferably 0.3 to 50% by mass, based on the total mass of the treatment liquid. By setting the concentration of the fluorinating agent at 0.1% by mass or more, it is possible to prevent insufficient introduction of fluorine atoms into the treatment target such as a catalytically active species.

When the fluorination treatment is performed, the treatment temperature is preferably −50° C. to 600° C., more preferably −20° C. to 350° C., still more preferably −10° C. to 250° C., and particularly preferably −10° C. to 100° C. By setting the treatment temperature at −50° C. or higher, it is possible to promote introduction of fluorine atoms into the treatment target such as a catalytically active species. Meanwhile, by setting the treatment temperature at 600° C. or lower, it is possible to prevent consumption of carbon due to the formation of $CF_4$ by fluorination of the carbon material. It is also possible to prevent degradation of the conductivity of the fuel cell catalyst and enlargement of the catalyst active species due to sintering.

The treatment time (reaction time) of the fluorination treatment is not particularly limited as long as fluorine atoms can be uniformly introduced into the treatment target such as a catalytically active species. Usually, the treatment time is preferably 0.5 minute to 12 hours. By setting the treatment time at 0.5 minute or more, it is possible to achieve sufficient fluorination of the surface of the carbon material and the inside of pores. Meanwhile, by setting the treatment time at 12 hours or less, it is possible to prevent degradation of manufacturing efficiency due to a longer manufacturing time.

When the fluorination treatment is performed, the pressure condition is not particularly limited, and the fluorination treatment can be performed under normal pressure, under pressure or under reduced pressure. From the viewpoint of the economy and safety, the fluorination treatment is preferably performed under normal pressure. A reaction vessel for performing the fluorination treatment is not particularly limited, and it is possible to employ a conventionally known one such as a fixed bed or a fluidized bed.

It is preferable to subject a treatment target such as a catalytically active species to a decompression treatment immediately before and/or immediately after the fluorination treatment. Examples of the method of the decompression treatment include a method of evacuating the treatment target in the reaction vessel. This makes it possible to remove moisture adhered to the surface of the carbon material as the carrier, unreacted treatment gas (including an unreacted fluorine atom-containing gas, etc.), and reaction by-products produced by the fluorination treatment.

When the decompression treatment is performed, the pressure condition is preferably in a range of 0 Pa to 100 Pa, more preferably 0 Pa to 50 Pa, and particularly preferably 0 Pa to 10 Pa. By setting the pressure at 100 Pa or less, as mentioned above, it is possible to remove moisture adhered to the surface of the carrier, unreacted treatment gas and reaction by-products by the fluorination treatment.

The treatment time of the decompression treatment is not particularly limited, but is usually in a range of 10 minutes to 2 hours, preferably 10 minutes to 1.5 hours, and more preferably 10 minutes to 1 hour.

<Refluorination Treatment>

The refluorination treatment is a step which is performed for the purpose of introducing fluorine atoms into those in which a fluorinated catalytically active species is supported on a non-fluorinated carbon material, or those in which a non-fluorinated catalytically active species is supported on a fluorinated carbon material.

In the refluorination treatment, it is possible to employ the same method as that of the above-mentioned fluorination treatment. It is also possible to appropriately change the treatment conditions in the refluorination treatment, specifically, the type of the treatment gas or treatment liquid, the concentration of fluorine atoms in the treatment gas and treatment liquid, the treatment temperature, the treatment time and the treatment pressure, as necessary, within a range of the treatment conditions described in the above-mentioned fluorination treatment.

Further, even when the refluorination treatment is performed, it is preferable that the treatment target is subjected to the decompression treatment on immediately before and/or immediately after the refluorination treatment. The method of decompression treatment is the same as mentioned above. This makes it possible to remove moisture adhered to the surface of the carbon material, unreacted treatment gas (including unreacted fluorine atom-containing gas, etc.) and reaction by-products by the fluorination treatment.

(Fuel Cell)

Next, a fuel cell using the fuel cell catalyst of the present embodiment will be described with reference to FIG. 1. FIG. 1 is a schematic cross-sectional view showing a fuel cell having a single cell structure according to the present embodiment.

As shown in FIG. 1, a fuel cell element 1 of the present embodiment comprises at least a membrane electrode assembly (MEA) 10, a pair of gas diffusion layers 13, a pair of separators 14, and a gasket 15. The pair of gas diffusion layers 13 each comprises an anode side gas diffusion layer 13a and a cathode side gas diffusion layer 13b, which are stacked on both sides of the membrane electrode assembly 10 so as to sandwich the membrane electrode assembly 10 therebetween. Further, the pair of separators 14 are stacked so as to sandwich the anode side gas diffusion layer 13a and the cathode side gas diffusion layer 13b therebetween. The gasket 15 is arranged so as to cover a polymer electrolyte membrane on the outer periphery of the membrane electrode assembly 10 (details will be described later).

The fuel cell element 1 can be used, for example, as a cell stack structure in which a plurality of fuel cell elements 1 are stacked in series via a connecting member. This makes it possible to realize a high power output fuel cell.

<Membrane Electrode Assembly for Fuel Cell>

The membrane electrode assembly 10 of the present embodiment comprises at least a solid polymer electrolyte membrane 11 and a pair of electrode catalyst layers 12 provided on both sides the solid polymer electrolyte membrane 11, more specifically an anode side electrode catalyst layer (fuel electrode) 12a and a cathode side electrode catalyst layer (air electrode) 12b.

The solid polymer electrolyte membrane 11 preferably has proton conductivity and electronic insulation. It is possible to use, as the solid polymer electrolyte membrane 11, a membrane made of a known material such as a polymer or copolymer having high proton conductivity and an ion exchange group. Specific examples thereof include a fluorine-based resin in which polymer skeletons are partially or entirely fluorinated, or an aromatic hydrocarbon resin in which polymer skeletons contain no fluorine atom.

Examples of the fluorine-based resin include, but are not particularly limited to, perfluorocarbonsulfonic acid-based polymers such as Nafion (registered trademark, DuPont de Nemours, Inc.), Aciplex (registered trademark, Asahi Kasei Corporation), Flemion (registered trademark, AGC Inc.) and GORE-SELECT (registered trademark, W. L. Gore &Associates, Inc.), polytrifluorostyrenesulfonic acid-based polymers, perfluorocarbonphosphonic acid-based polymers, trifluorostyrenesulfonic acid-based polymers, ethylenetetrafluoroethylene-g-styrenesulfonic acid-based polymers, ethylene-tetrafluoroethylene copolymers, polytetrafluoroethylene-g-polystyrenesulfonic acid-based polymers and polypolyvinylidene fluoride-g-polystyrenesulfonic acid-based polymers.

Examples of the aromatic hydrocarbon resin include, but are not particularly limited to, polysulfone sulfonic acid-based polymers, polyether ether ketone sulfonic acid-based polymers, polybenzimidazole alkyl sulfonic acid-based polymers, polybenzimidazole alkyl phosphonic acid-based polymers, crosslinked polystyrene sulfonic acid-based polymers, polyether sulfone sulfonic acid-based polymers and the like.

The thickness of the solid polymer electrolyte membrane 11 is not particularly limited, but is usually 5 to 300 and preferably 10 to 200 If the thickness of the solid polymer electrolyte membrane 11 is 5 μm or more, it is possible to secure sufficient mechanical strength when the membrane electrode assembly 10 is formed. Meanwhile, if the thickness of the solid polymer electrolyte membrane 11 is 300 μm or less, it is possible to reduce the membrane resistance of the solid polymer electrolyte membrane 11, leading to an improvement in power generation performance.

The anode side electrode catalyst layer 12a and the cathode side electrode catalyst layer 12b, as the electrode catalyst layer 12, each comprises at least a fuel cell catalyst according to the present embodiment and an ionomer (electrolyte) which coats the fuel cell catalyst and has the proton conductivity. Since the anode side electrode catalyst layer 12a and the cathode side electrode catalyst layer 12b each includes pores, it is possible to diffuse hydrogen gas inside the anode side electrode catalyst layer 12a. In the cathode side electrode catalyst layer 12b, oxygen gas can be diffused inside, or water produced by the reduction reaction of oxygen molecules can be permeated.

In the anode side electrode catalyst layer 12a, the ionomer functions as a path through which protons generated by the oxidation reaction of hydrogen molecules move to the solid polymer electrolyte membrane 11. Meanwhile, in the cathode side electrode catalyst layer 12b, protons permeated the solid polymer electrolyte membrane 11 function as a path through which the protons move to the vicinity of the supported catalytically active species.

Examples of the ionomer include fluororesins, aromatic hydrocarbon resins, ionic liquids and the like. It is possible to use, as the fluororesin and aromatic hydrocarbon resin, the same fluororesin and aromatic hydrocarbon resin used in the solid polymer electrolyte 11 mentioned above. When using an ionomer composed of the fluororesin, in case where the carrier (carbon material) in the fuel cell catalyst of the present embodiment contains fluorine atoms, it is possible to improve the affinity between the ionomer and the fuel cell catalyst. This leads to a state where oxygen diffusion and proton diffusion, which are mentioned as rate-determining factors, are promoted at the three-phase interface in the electrode catalyst layer. As a result, the oxygen reduction reaction is improved, thus enabling high power output in the high current density region.

The ionic liquid is not particularly limited, but is preferably an ionic liquid having characteristics, for example, having high proton conductivity, maintaining a liquid state at a temperature in a range of −30° C. to 200° C., causing little change in physical properties even at high temperature of 400° C. or higher and having high heat resistance, and having low vapor pressure. Specifically, the ionic liquid is composed of a cation component and an anion component.

Examples of the cation component include a quaternary ammonium cation, a tertiary ammonium cation, a secondary ammonium cation, an imidazolium cation, a pyrazolium cation, a pyridinium cation, a phosphonium cation, a sulfonium cation and the like.

Examples of the quaternary ammonium cation include tetraethylammonium cation, tetrapropylammonium cation, tetraisopropylammonium cation, trimethylethylammonium cation, diethyldimethylammonium cation, methyltriethylammonium cation, trimethylpropylammonium cation, trimethylisopropylammonium cation, tetrabutylammonium cation, trimethylbutylammonium cation, trimethylpentylammonium cation, trimethylhexylammonium cation, butyltriethylammonium cation, triethylpentylammonium cation, tetrabutylammonium cation, tributylmethylammonium cation, ethyldimethylpropylammonium cation, methyltrioctylammonium cation, diethyl-2-methoxyethylmethylammonium cation, ethyl-2-methoxyethyldimethylammonium cation, ethyl-3-methoxypropyldimethylammonium cation, benzylethyldimethylammonium cation, ethyldimethyl-2-phenylethylammonium cation, 1-methyl-1-propylpyrrolidinium cation, 1-butyl-1-methylpyrrolidinium cation, 1-methoxymethyl-1-methylpyrrolidinium cation, 1-(2-methoxyethyl)-1-methylpyrrolidinium cation, 1-allyl-1-methylpyrrolidinium cation, 1-methyl-1-propylpiperidinium cation, 1-butyl-1-methyl piperidinium cation and the like.

Examples of the tertiary ammonium cation include trimethylammonium cation, triethylammonium cation, tripropylammonium cation, tributylammonium cation, dimethylethylammonium cation, methyldiethylammonium cation, triisopropylammonium cation, dimethylisopropylammonium cation, diethylisopropylammonium cation, dimethylpropylammonium cation, dimethylbutylammonium cation, 1-methylpyrrolidinium cation, 1-ethylpyrrolidinium cation, 1-propylpyrrolidinium cation, 1-butylpyrrolidinium cation, 1-methylpiperidinium cation, 1-ethylpiperidinium cation, 1-propylpiperidinium cation, 1-butylpiperidinium cation and the like.

Examples of the secondary ammonium cation include dimethylammonium cation, diethylammonium cation, dipropylammonium cation, diisopropylammonium cation, dibutylammonium cation, ethylmethylammonium cation, methylisopropylammonium cation, ethylisopropylammonium cation, butylmethylammonium cation, pyrrolidinium cation, piperidinium cation and the like.

Examples of the imidazolium cation include 1,3-dimethyl-imidazolium cation, 1-ethyl-3-methylimidazolium cation, 1-methyl-3-octylimidazolium cation, 1-methyl-3-propylimidazolium cation, 1-butyl-3-methylimidazolium cation, 1-hexyl-3-methylimidazolium cation, 1-ethyl-2,3-dimethylimidazolium cation, 1-butyl-2,3-dimethylimidazolium cation, 1-allyl-3-methylimidazoium cation, 1-methylimidazolium cation, 1-ethylimidazolium cation, 1-vinylimidazolium cation, 1-allylimidazole, 2-methylimidazolium cation, imidazolium cation and the like.

Examples of the pyrazolium cation include 1,2-dimethylpyrazolium cation, 1-methyl-2-ethylpyrazolium cation, 1-propyl-2-methylpyrazolium cation, 1-methyl-2-butylpyrazoium cation, 1,3-dimethylpyrazolium cation, 1,5-dimethylpyrazolium cation, 1-methylpyrazolium cation, 1-ethylpyrazolium cation, 3-methylpyrazolium cation, 4-methylpyrazolium cation, 3, 5-dimethylpyrazolium cation, pyrazolium cation, 4-iodopyrazolium cation, 4-bromopyrazolium cation, 4-iodo-1-methylpyrazolium cation, 4-bromo-1-methylpyrazolium, 5-iodo-1-methylpyrazolium cation, 5-bromo-1-methylpyrazolium cation, 3-iodopyrazolium cation, 3-bromopyrazolium cation, 3-trifluoromethylpyrazolium cation, 3-methyl-5-trifluoromethylpyrazolium and the like.

Examples of the pyridinium cation include 1-methylpyridinium cation, 1-ethylpyridinium cation, 1-propylpyridinium cation, 1-butylpyridinium cation, 1-ethyl-3-methylpyridinium cation, pyridinium cation and the like.

Examples of the phosphonium cation include butyltriethylphosphonium cation, triethylpentylphosphonium cation, triethyloctylphosphonium cation, triethylmethoxymethylphosphonium cation, triethyl(2-methoxyethyl) phosphonium cation, tributylmethylphosphonium cation, tributylethylphosphonium cation, tributyloctylphosphonium cation, tributylmethoxymethylphosphonium cation, tributyl(2-methoxyethyl) phosphonium cation and the like.

Examples of the sulfonium cation include trimethylsulfonium cation, triphenylsulfonium cation, triethylsulfonium cation and the like.

The cation components exemplified above can be used alone or in combination of two or more types thereof.

Examples of the anion component include a halogen anion, a fluorine-containing anion, a cyano group-containing anion, a fluorine-free phosphoric acid derivative anion, a fluorine-free sulfuric acid derivative anion and the like.

Examples of the halogen anion include $Cl^-$, $Br^-$, $I^-$ and the like.

Examples of the fluorine-containing anion include $BF_4^-$, $BF_3CF_3^-$, $BF_3C_2F_5^-$, $PF_6^-$, $PO_2F_2^-$, $PO_2(CF_3CH_2O)_2^-$, $CF_3SO_3^-$, $C_2F_5SO_3^-$, $C_3F_7SO_3^-$, $C_4F_9SO_3^-$, $N(SO_2O_2^-$, $N(CF_3SO_2)_2^-$, $N(C_2F_5SO_2)_2^-$, $N(CF_3SO_2)(CF_3CO)^-$, $N(CF_3SO_2)(C_2F_5SO_2)^-$, $C(CF_3SO_2)_3^-$, $(HF)_xF^-$ (X is 1.0 to 2.3), $SbF_6^-$, $AsF_6^-$, $CF_3COO^-$ and the like.

Examples of the cyano group-containing anion include $SCN^-$, $B(CN)_4^-$, $N(CN)_2^-$, $C(CN)_3^-$ and the like.

Examples of the fluorine-free phosphoric acid derivative anion include $PO_2(OCH_3)_2^-$, $PO_2(OC_2H_5)_2^-$, $PO_2[OCH(CH_3)_2]_2^-$, $PO_2(OC_4H_9)_2^-$, $HPO_2(OCH_3)^-$, $HPO_2(OC_2H_5)^-$, $HPO_2[OCH(CH_3)_2]^-$, $HPO_2(OC_4H_9)^-$ and the like.

Examples of the fluorine-free sulfuric acid derivative anion include $CH_3SO_3^-$, $C_2H_5SO_3^-$, $SO_3(OCH_3)^-$, $SO_3(OC_2H_5)^-$, $SO_3[OCH(CH_3)]^-$, $SO_3(OC_4H_9)^-$ and the like.

The anion components exemplified above can be used alone or in combination of two or more types thereof.

When the ionomer is an ionic liquid, the electrode catalyst layer 12 may contain a fixing agent. By containing the fixing agent, the ionic liquid is fixed in the electrode catalyst layer 12, and its shape and position are retained. This makes it possible to suppress blocking of voids due to the ionic liquid, thus enabling satisfactorily flow of a fluid through the electrode catalyst layer 12. As a result, it becomes possible to satisfactory form the three-phase interface in the electrode catalyst layer 12.

The thickness of the electrode catalyst layer 12 is not particularly limited, but is usually 0.1 to 100 μm, preferably 1 to 50 μm. By setting the thickness of the electrode catalyst layer 12 at 0.1 μm or more, it is possible to obtain a desired amount of power generation of the fuel cell. Meanwhile, by setting the thickness of the electrode catalyst layer 12 at 100 μm or less, it is possible to suppress the resistance of gas diffusion of hydrogen gas or oxygen gas in the electrode catalyst layer 12 and to satisfactorily discharge water formed as by-product. As a result, the power generation performance of the fuel cell can be further improved.

The fabrication method of the electrode catalyst layer 12 is not particularly limited, and a known fabrication method can be used. Examples of the fabrication method include a method in which a catalyst ink obtained by dispersing the fuel cell catalyst of the present embodiment and the ionomer (electrolyte having proton conductivity) in water or an organic solvent is directly applied to the solid polymer electrolyte membrane 11 and dried to form the electrode catalyst layer. Alternatively, there is exemplified a method in which a catalyst ink is applied to a sheet made of polytetrafluoroethylene (PTFE), dried and then transferred to the solid polymer electrolyte membrane 11 by hot pressing to form the electrode catalyst layer.

Examples of the organic solvent in which the fuel cell catalyst of the present embodiment and the ionomer are dispersed include, but are not particularly limited to, methanol, ethanol, 1-propanol, 2-propanol, 1-butanol, 2-butanol, isobutyl alcohol, tert-butyl alcohol, pentanol, acetone, methyl ethyl ketone, pentanone, methyl isobutyl ketone, heptanone, cyclohexanone, methylcyclohexanone, acetonyl acetone, diisobutyl ketone, tetrahydrofuran, dioxane, diethylene glycol dimethyl ether, anisole, methoxytoluene, dibutyl ether, dimethylformamide, dimethylacetamide, N-methylpyrrolidone, ethylene glycol, diethylene glycol, diacetone alcohol, 1-methoxy-2-propanol and the like.

A mixing ratio of the fuel cell catalyst and the ionomer in the catalyst ink is not particularly limited. Usually, a mass ratio of the ionomer to the carrier (containing fluorine atoms when the carrier is fluorinated) of the fuel cell catalyst is 30 to 200% by mass, preferably 40 to 150% by mass, and still more preferably 50 to 120% by mass. By setting the mass ratio of the ionomer to the carrier of the fuel cell catalyst at 30% by mass or more, the structures of the thus formed anode side electrode catalyst layer 12a and cathode side electrode catalyst layer 12b become stable, thus enabling satisfactory ionic conductivity inside the electrode catalyst layer 12. By setting the mass ratio of the ionomer to the carrier of the fuel cell catalyst at 200% by mass or less, it is possible to suppress excessive coating of the surface of the catalytically active species with the ionomer. As a result, satisfactory three-phase interface can be formed.

There is no particular limitation on the method for dispersing the fuel cell catalyst and the electrolyte in the solvent, and dispersion can be performed using a known dispersing device such as a ball mill, a dissolver, an ultrasonic homogenizer or a high pressure homogenizer. There is no particular limitation on the method of drying the catalyst ink, and drying can be performed by natural drying, hot air drying, infrared ray drying or the like. There is no particular limitation on drying conditions such as drying time and drying temperature, and drying conditions can be appropriately set according to the concentration of the catalyst ink, the coating amount and the like.

<Gas Diffusion Layer>

The gas diffusion layer 13 is made of a porous material having electron conductivity. The electron conductivity enables electron transfer derived from the reaction of the fuel cell. The porous material constituting the gas diffusion layer enables satisfactory diffusion of hydrogen gas contained in the fuel gas in the anode side gas diffusion layer 13a, and enables satisfactory diffusion of air contained in the oxidant gas in the cathode side gas diffusion layer 13b. In the cathode side electrode catalyst layer 12b, the porous material also functions as a discharge path for discharging by-produced water.

The material of the gas diffusion layer 13 is not particularly limited, but it is preferably a material which is inert to hydrogen gas contained in the fuel gas and air contained in the oxidant gas, and has high fluid diffusibility, corrosion resistance and high electron conductivity. Examples of such a material include a carbon paper, a carbon cloth and a porous substrate, such as TORAYCA (registered trademark, Toray Industries, Inc.) or Pyrofil (registered trademark, Mitsubishi Rayon Co., Ltd.).

The thickness of the gas diffusion layer 13 in the present invention is not particularly limited, but is usually 50 to 500 μm, and preferably 100 to 300 μm. By setting the thickness of the gas diffusion layer 13 at 50 μm or more, it is possible to maintain the mechanical strength of the gas diffusion layer 13. By setting the thickness of the gas diffusion layer 13 at 500 μm or less, it is possible to suppress the resistance of gas diffusion in the gas diffusion layer 13 and to satisfactorily discharge by-produced water. As a result, the power generation performance of the fuel cell can be further improved.

<Separator>

The material of the separator 14 is not particularly limited, but it is preferably a material which is inert to the hydrogen gas contained in the fuel gas and the air contained in the oxidant gas, and has high gas sealing property and imparts corrosion resistance. A material having high electron conductivity and excellent mechanical strength is also preferable. Examples of such a material include those made of carbon such as isotropic carbon or carbon plate. There are also exemplified those made of metal such as stainless steel. It is also possible to use those in which a member made of metal such as stainless steel, titanium or aluminum is coated with a carbon material on its surface. The separator 14 preferably has a function of separating hydrogen, which is a fuel, from air, thus making it possible to form a gas passage on the surface thereof. The thickness of the separator 14 is not particularly limited, and can be appropriately set as necessary.

<Gasket>

The gasket 15 is provided between the solid polymer electrolyte membrane 11 and the separator 14 at a position adjacent to the ends of the electrode catalyst layer 12 and the gas diffusion layer 13. Since the fuel cell 1 includes the gasket 15, the ends of the electrode catalyst layer 12 and the gas diffusion layer 13 are sealed, thus making it possible to prevent gas to be supplied from leaking from the ends of the electrode catalyst layer 12 and the gas diffusion layer 13.

When the fuel cell 1 is fabricated, pressure is generated from the separators 14 on both sides toward the center (toward the solid polymer electrolyte membrane 11). However, by providing the gasket 15, it is possible to prevent voids of the electrode catalyst layer 12 and the diffusion layer 13 from being crushed by the pressure.

It is possible to use, as the material of the gasket 15, a known material which is inert to hydrogen gas contained in the fuel gas and air contained in the oxidant gas and has high gas sealing property, and also causes little contract displacement against pressure during cell assembling and has satisfactory dimensional stability. Examples thereof include rubber materials such as fluororubber, silicone rubber, ethylene propylene rubber (EPDM) and polyisobutylene rubber; fluorine-based polymer materials such as polytetrafluoroethylene (PTFE), polyvinylidene fluoride (PVDF), polyhexafluoropropylene, tetrafluoroethylene-hexafluoropropylene copolymer (FEP); and thermoplastic resins such as polyolefin and polyester.

The thickness of the gasket 15 is not particularly limited, and can be appropriately set according to the thickness of the electrode catalyst layer 12 and the gas diffusion layer 13.

EXAMPLES

Suitable Examples of the present invention will be described in detail below. However, materials or mixing amounts mentioned in these Examples do not purport to limit the scope of the present invention only to these unless there is a definitive description.

Example 1

<Fluorination Treatment of Carrier>

In a polytetrafluoroethylene (PTFE) vessel (volume: 5 mL), 0.300 g of carbon black having a specific surface area of 800 m$^2$/g (trade name; KETJENBLACK EC300J, Lion Specialty Chemicals Co., Ltd.) was charged as a carrier, and the vessel was placed in an electropolished chamber made of SUS316L (volume: 30 mL). Next, after evacuating the chamber, nitrogen gas was introduced (vacuum replacement). Under a nitrogen stream (20 mL/min), the temperature inside the chamber was raised to 250° C. at a temperature rising rate of 4° C./min, and an isothermal treatment was performed for 1 hour. Then, the temperature in the chamber was lowered to 50° C. and an isothermal treatment was performed for 1 hour.

Evacuation was performed while maintaining the temperature in the chamber at 50° C. to remove the nitrogen gas, and then a mixed gas prepared by diluting fluorine ($F_2$) gas was nitrogen gas to the concentration of 10 vol % (treatment gas) was introduced (vacuum displacement). Thereby, the carbon black was fluorinated. The treatment conditions for the fluorination treatment are as follows: treatment time; 4 hours, treatment temperature; 50° C. and treatment pressure; normal pressure. After evacuating inside the chamber (10 Pa) to remove the mixed gas, nitrogen gas was introduced (vacuum replacement), followed by allowing to cool to room temperature under a nitrogen stream (20 mL/min), thus fabricating fluorinated carbon black (i.e., carbon black containing fluorine atoms introduced thereinto).

<Fabrication of Fuel Cell Catalyst>

To 100 mL of an aqueous solution containing 0.797 g of chloroplatinic acid hexahydrate ($H_2PtCl_6 \cdot 6H_2O$) dissolved therein, 0.300 g of the fluorinated carbon black was added, and then the carrier was dispersed in the aqueous solution using an ultrasonic homogenizer. To this dispersion, an aqueous 1 mol/L sodium hydroxide solution was added to adjust the pH in a range of 11 to 12.

Subsequently, this dispersion was heated to 90° C. under $N_2$ atmosphere, and a $NaBH_4$ solution was added to reduce platinum. After reduction, the dispersion was subjected to solid-liquid separation, and crystals thus obtained were washed and then vacuum dried under a temperature condition of 90° C. to fabricate a platinum-supported fuel cell catalyst.

Example 2

In this Example, the concentration of the fluorine gas in the treatment gas during the fluorination treatment was changed to 5 vol %. In the same manner as in Example 1 except for that, a fuel cell catalyst according to this Example was fabricated.

Example 3

In this Example, the concentration of the fluorine gas in the treatment gas during the fluorination treatment was changed to 20 vol %. In the same manner as in Example 1 except for that, a fuel cell catalyst according to this Example was fabricated.

Comparative Example 1

In this Comparative Example, a platinum-supported catalyst (product number: TEC10E50E, manufactured by Tanaka Kikinzoku Kogyo KK) in which platinum was supported on non-fluorinated KETJENBLACK (carrier) was used as a fuel cell catalyst.

Example 4

In this Example, the concentration of the fluorine gas in the treatment gas during the fluorination treatment was changed to 80 vol % and the treatment temperature was changed to 80° C. In the same manner as in Example 1 except for that, a fuel cell catalyst according to this Example was fabricated.

Example 5

In this Example, a platinum-supported catalyst (product number: TEC10E50E, manufactured by Tanaka Kikinzoku Kogyo KK) in which platinum was supported on non-fluorinated KETJENBLACK (carrier) was subjected to a fluorination treatment. The concentration of the fluorine gas in the treatment gas during the fluorination treatment was changed to 10 vol %. In the same manner as in Example 1 except for that, a fuel cell catalyst according to this Example was fabricated.

Example 6

In this Example, the fuel cell catalyst obtained in Example 2 was subjected again to the fluorination treatment. The conditions for the fluorination treatment again were the same as in Example 1 to fabricate a fuel cell catalyst according to this Example.

(Platinum Content in Fuel Cell Catalyst)

In the fuel cell catalysts obtained in Examples 1 to 6 and Comparative Example 1, the platinum content relative to the total mass of each fuel cell catalyst was determined. In other words, using an electric furnace, each fuel cell catalyst was burned in an oxygen atmosphere at 800° C. The platinum content was calculated from the weight before burning, with the residual amount after burning as the platinum amount. The results are shown in Table 1.

Subsequently, the content of fluorine atoms in each of whole fuel cell catalysts was calculated from the quantitatively determined content of fluorine ions. Furthermore, the platinum content converted based on the above-mentioned platinum content and the content of fluorine atoms in the whole fuel cell catalyst were removed from the mass of the fuel cell catalyst, thereby calculating the carbon content in the whole fuel cell catalyst. Thereby, a ratio (F/C)w of the number of fluorine atoms to the number of carbon atoms in the whole fuel cell catalyst was obtained, and (F/C)s/(F/C)w was further calculated. The results are shown in Table 1.

(Work Function of Fuel Cell Catalyst)

Each work function of the fuel cell catalysts of Examples 1 to 6 and Comparative Example 1 were determined. The work function was determined by ultraviolet photoelectron spectroscopy using a multifunctional scanning X-ray photoelectron spectroscopy analyzer (VersaProbe III, manufactured by ULVAC-PHI, INCORPORATED). The measurement conditions are as follows: ultraviolet ray source; HeI ray, pass energy; 1.3 eV, step energy; 0.005 eV and detection angle; 90°. Then, the work function of each fuel cell catalyst was calculated by determining the energy difference between the binding energy and the vacuum level. The results are shown in Table 1.

TABLE 1

|  | Concentration of Fluorine gas in Treatment gas(vol %) | Treatment Temperature of Fluorination Treatment(° C.) | Content of platinum (% by mass) | Content of fluorine atoms (% by mass) | (F/C)s | (F/C)s/ (F/C)w | Work Function (eV) |
|---|---|---|---|---|---|---|---|
| Example 1 | 10 | 50 | 43.9 | 2.6 | 0.020 | 0.77 | 5.2 |
| Example 2 | 5 | 50 | 46.1 | 1.0 | 0.004 | 0.35 | 5.2 |
| Example 3 | 20 | 50 | 39.5 | 15.0 | 0.164 | 0.79 | 6.5 |
| Comparative Example 1 | — | — | 46.5 | — | — | — | 5.2 |
| Example 4 | 80 | 80 | 38.3 | 23.0 | 0.352 | 0.94 | 7.3 |
| Example 5 | 10 | 50 | 40.1 | 5.2 | 0.043 | 0.77 | 5.3 |
| Example 6 | 5→10 | 50 | 42.3 | 3.7 | 0.031 | 0.78 | 5.5 |

(Elemental Analysis of Fuel Cell Catalyst Surface)

The fuel cell catalysts obtained in Examples 1 to 6 were subjected to quantitative analysis of fluorine atoms and carbon atoms on their surfaces. The quantitative analysis was performed by X-ray photoelectron spectroscopy using a multifunctional scanning X-ray photoelectron spectroscopy analyzer (VersaProbe III, manufactured by ULVAC-PHI, INCORPORATED). The measurement conditions are as follows: X-ray source; AlKα ray, pass energy; 112 eV, step energy; 0.05 eV and detection angle; 45°. A ratio (F/C)s of the number of fluorine atoms and the number of carbon atoms on the surface of each fuel cell catalyst was calculated from the peak intensities of C1s and F1s photoelectron spectroscopy spectra. The results are shown in Table 1.

(Elemental Analysis of Whole Fuel Cell Catalyst)

The fuel cell catalysts obtained in Examples 1 to 6 were subjected to quantitative analysis of fluorine atoms and carbon atoms of the whole fuel cell catalyst. The quantitative analysis was performed by the combustion flask method.

In other words, each fuel cell catalyst was burned in a 500 mL volumetric flask filled with oxygen gas, followed by sealing. Subsequently, the gas generated by combustion was absorbed by the sample liquid (aqueous mixed solution of 1.7 mmol/L sodium hydrogen carbonate, 1.8 mmol/L sodium carbonate) in the flask, and the content of fluorine ions contained in the test liquid was quantitatively determined by ion chromatography (Dionex Corporation, ICS-1000, Column AS-23).

(Fabrication of Fuel Cell)
<Fabrication of Cathode Side Electrode Catalyst Layer>

Based on the platinum content in the fuel cell catalysts of Examples 1 to 6 or Comparative Example 1, the fuel cell catalysts were weighed so that the platinum content became 16 mg. Next, a Nafion (registered trademark) solution (manufactured by DuPont de Nemours, Inc., DE520CS Type) as an ionomer was added thereto. The amount of the ionomer added was set at 70% by mass relative to the mass of the carrier excluding platinum and fluorine atoms in the fuel cell catalyst.

Subsequently, a mixed solvent of ultrapure water and 2-propanol at a volume ratio of 1:1 was added to the mixture of the fuel cell catalyst and the ionomer, respectively. At this time, the mixed solvent was added so that the solid content of the fuel cell catalyst and the ionomer became 5% by mass. Then, the fuel cell catalyst and the ionomer were dispersed for 30 minutes using an ultrasonic homogenizer to fabricate catalyst inks according to Examples 1 to 6 and Comparative Example 1.

Next, each of the thus fabricated catalyst inks was applied to a polytetrafluoroethylene (PTFE) sheet and dried. Thereby, the cathode side electrode catalyst layers according to Examples 1 to 6 and Comparative Example 1 were formed on the PTFE sheet. The amount of catalyst ink applied was set so that the amount of platinum per unit area of the electrode catalyst layer formed became 0.25 mg/cm².

<Fabrication of Anode Side Electrode Catalyst Layer>

Using a commercially available platinum-supported catalyst (product number: TEC10E50E, Tanaka Kikinzoku Kogyo KK), the platinum-supported catalyst was weighed so that the platinum content became 16 mg. Next, a Nafion (registered trademark) solution (manufactured by DuPont de Nemours, Inc., DE520CS Type) as an ionomer was added. The amount of the ionomer added was set at 100% by mass with respect to the mass of the carrier excluding platinum in the fuel cell catalyst.

Subsequently, a mixed solvent of ultrapure water and 2-propanol at a volume ratio of 1:1 was added to the mixture of the fuel cell catalyst and the ionomer. At this time, the mixed solvent was added so that the solid content of the platinum-supported catalyst and the ionomer became 5% by mass. Then, the platinum-supported catalyst and the ionomer were dispersed for 30 minutes using an ultrasonic homogenizer to fabricate a catalyst ink.

Next, the thus fabricated catalyst ink was applied to a PTFE sheet and dried. Thereby, the anode side electrode catalyst layer was formed on the PTFE sheet. The amount of the catalyst ink applied was set so that the weight per unit area of the formed electrode catalyst layer became 0.25 mg/cm².

<Assembling of Fuel Cell>

The anode side electrode catalyst layer formed on the PTFE sheet and the cathode side electrode catalyst layer formed on the PTFE sheet were respectively cut into 1 cm square, which was stacked on both sides of a solid polymer electrolyte membrane (NR-211, DuPont de Nemours, Inc.) to fabricate a stack.

Next, this stack was pressed under pressure of 1.2 MPa at 150° C. for 3 minutes to transfer the anode side electrode catalyst layer and the cathode side electrode catalyst layer formed on the PTFE sheet to the solid polymer electrolyte membrane. Then, the PTFE sheet was peeled off. By this method, membrane electrode assemblies using the fuel cell catalysts according to Examples 1 to 6 and Comparative Example 1 were respectively fabricated. At this time, the thickness of each of the anode side electrode catalyst layer and the cathode side electrode catalyst layer was 7 μm, and the thickness of the solid polymer electrolyte membrane was 25 μm.

Furthermore, a pair of gas diffusion layers (TGP-H-060, manufactured by Toray Industries, Inc.) were arranged so as to sandwich each membrane electrode assembly therebetween, and gas diffusion layers (thickness 190 μm) were stacked.

Subsequently, a separator having a groove serving as a gas flow path is arranged and sandwiched on both sides of the pair of gas diffusion layers to respectively fabricate the fuel cells according to Examples 1 to 6 and Comparative Example 1.

(Evaluation of Output Voltage)

The initial output voltage of the fuel cells according to Examples 1 to 6 and Comparative Example 1 was evaluated.

In the thus obtained fuel cell, hydrogen gas (usage rate: 5%) was supplied to the anode side at normal pressure, and oxygen (usage rate: 5%) was supplied to the cathode side by supplying air. The relative humidity in the cell was 60% RH. At a cell temperature of 80° C., the output voltage (initial cell voltage) at the beginning of operation when the current density during operation was 1.0 A/cm$^{-2}$ was measured. The results are shown in Table 2.

(Starting/Stopping of Fuel Cell)

The temperature of the fuel cell was set at 80° C. and humidification was controlled so that the relative humidity in the cell became 100% RH, and then nitrogen gas was supplied to the anode side and the cathode side, respectively.

Subsequently, potential scanning was repeated at a potential scanning speed of 0.5 V/sec at a potential in a range of 1.0 to 1.5 V, and this operation was regarded as a potential scanning cycle simulating starting and stopping of each fuel cell. The output voltage of each fuel cell was measured after 1,500 cycles. The measurement method was the same as mentioned above. The results are shown in Table 2.

TABLE 2

|  | Output Voltage(V) | Output Voltage after 1,500 cycles of Starting/Stopping(V) |
|---|---|---|
| Example 1 | 0.573 | 0.395 |
| Example 2 | 0.571 | 0.401 |
| Example 3 | 0.550 | 0.363 |
| Comparative Example 1 | 0.500 | 0.279 |
| Example 4 | 0.530 | 0.330 |
| Example 5 | 0.580 | 0.387 |
| Example 6 | 0.573 | 0.390 |

EXPLANATION OF REFERENCES

1: Fuel cell
10: Membrane electrode assembly
11: Solid polymer electrolyte membrane
12: Electrode catalyst layer
12a: Anode side electrode catalyst layer
12b: Cathode side electrode catalyst layer
13: Gas diffusion layer
13a: Anode side gas diffusion layer
13b: Cathode side gas diffusion layer
14: Separator
15 Gasket

The invention claimed is:

1. A fuel cell catalyst comprising at least a catalytically active species and a carrier supporting the catalytically active species, wherein
   the catalytically active species is at least one selected from the group consisting of platinum, a platinum alloy, and a core-shell catalyst in which a core of a metal different from platinum is coated with a shell containing platinum,
   the carrier is a carbon material, and
   at least one of the catalytically active species and the carrier contains fluorine atoms,
   the fluorine atoms contained in the catalytically active species are present by being adsorbed on a surface of the catalytically active species,
   the fluorine atoms contained in the carrier are present by being adsorbed on an outer surface of the carbon material that is the carrier and on an inner surface of pores,
   a ratio of the number of fluorine atoms contained in at least one of the catalytically active species and the carrier to the number of carbon atoms contained in the carrier satisfies a relationship shown in the following formula (1):

$$(F/C)s/(F/C)w<0.8 \qquad (1)$$

where $(F/C)s$ represents a ratio of the number of fluorine atoms to the number of carbon atoms on the surface of the fuel cell catalyst, and (F/C)w represents a ratio of the number of fluorine atoms to the number of carbon atoms in the whole fuel cell catalyst.

2. The fuel cell catalyst according to claim 1, wherein the (F/C)s is less than 0.4.

3. The fuel cell catalyst according to claim 1, wherein the carbon material is at least one selected from the group consisting of graphite, graphite oxide, carbon black, graphitized carbon black, diamond-like carbon, fullerene, single-walled carbon nanotube, multi-walled carbon nanotube, carbon nanohorn, carbon nanowall, carbon nanofiber, carbon nanobrush, single layer graphene, multilayer graphene and graphene oxide.

4. The fuel cell catalyst according to claim 1, wherein a work function of the fuel cell catalyst is 4 to 7.5 eV.

5. A membrane electrode assembly for fuel cell, comprising at least a solid polymer electrolyte membrane and an electrode catalyst layer arranged on both sides of the solid polymer electrolyte membrane, wherein
the electrode catalyst layer comprises at least a fuel cell catalyst and an ionomer which coats the fuel cell catalyst,
the fuel cell catalyst comprises at least a catalytically active species and a carrier supporting the catalytically active species,
the catalytically active species is at least one selected from the group consisting of platinum, a platinum alloy, and a core-shell catalyst in which a core of a metal different from platinum is coated with a shell containing platinum,
the carrier is a carbon material,
at least one of the catalytically active species and the carrier contains fluorine atoms,
the fluorine atoms contained in the catalytically active species are present by being adsorbed on a surface of the catalytically active species,
the fluorine atoms contained in the carrier are present by being adsorbed on an outer surface of the carbon material that is the carrier and on an inner surface of pores,
a ratio of the number of fluorine atoms contained in at least one of the catalytically active species and the carrier to the number of carbon atoms contained in the carrier satisfies a relationship shown in the following formula (1):

$$(F/C)s/(F/C)w<0.8 \quad (1)$$

where (F/C)s represents a ratio of the number of fluorine atoms to the number of carbon atoms on the surface of the fuel cell catalyst, and (F/C)w represents a ratio of the number of fluorine atoms to the number of carbon atoms in the whole fuel cell catalyst.

6. The membrane electrode assembly for fuel cell according to claim 5, wherein the ionomer is a fluorine-based resin.

7. The membrane electrode assembly for fuel cell according to claim 5, wherein the ionomer is an aromatic hydrocarbon resin.

8. The membrane electrode assembly for fuel cell according to claim 5, wherein the ionomer is an ionic liquid.

9. A fuel cell comprising the membrane electrode assembly for fuel cell according to claim 5.

10. The membrane electrode assembly for fuel cell according to claim 5, wherein the (F/C)s is less than 0.4.

11. The membrane electrode assembly for fuel cell according to claim 5, wherein the carbon material is at least one selected from the group consisting of graphite, graphite oxide, carbon black, graphitized carbon black, diamond-like carbon, fullerene, single-walled carbon nanotube, multi-walled carbon nanotube, carbon nanohorn, carbon nanowall, carbon nanofiber, carbon nanobrush, single layer graphene, multilayer graphene and graphene oxide.

12. The membrane electrode assembly for fuel cell according to claim 5, wherein a work function of the fuel cell catalyst is 4 to 7.5 eV.

13. The fuel cell catalyst according to claim 1, wherein a content of the fluorine atoms is 0.1 to 30% by mass based on a total mass of the fuel cell catalyst.

14. The membrane electrode assembly for fuel cell according to claim 5, wherein a content of the fluorine atoms is 0.1 to 30% by mass based on a total mass of the fuel cell catalyst.

* * * * *